Aug. 26, 1924.

H. B. KLINE 1,506,491

DEPOSIT RECEIVING MACHINE

Filed May 12, 1922     9 Sheets-Sheet 1

Inventor
HAROLD B. KLINE.

By Martin & Rendell
Attorneys

Aug. 26, 1924.

H. B. KLINE 1,506,491

DEPOSIT RECEIVING MACHINE

Filed May 12, 1922      9 Sheets-Sheet 2

Inventor
HAROLD B. KLINE.

By Martin & Rendell
Attorneys

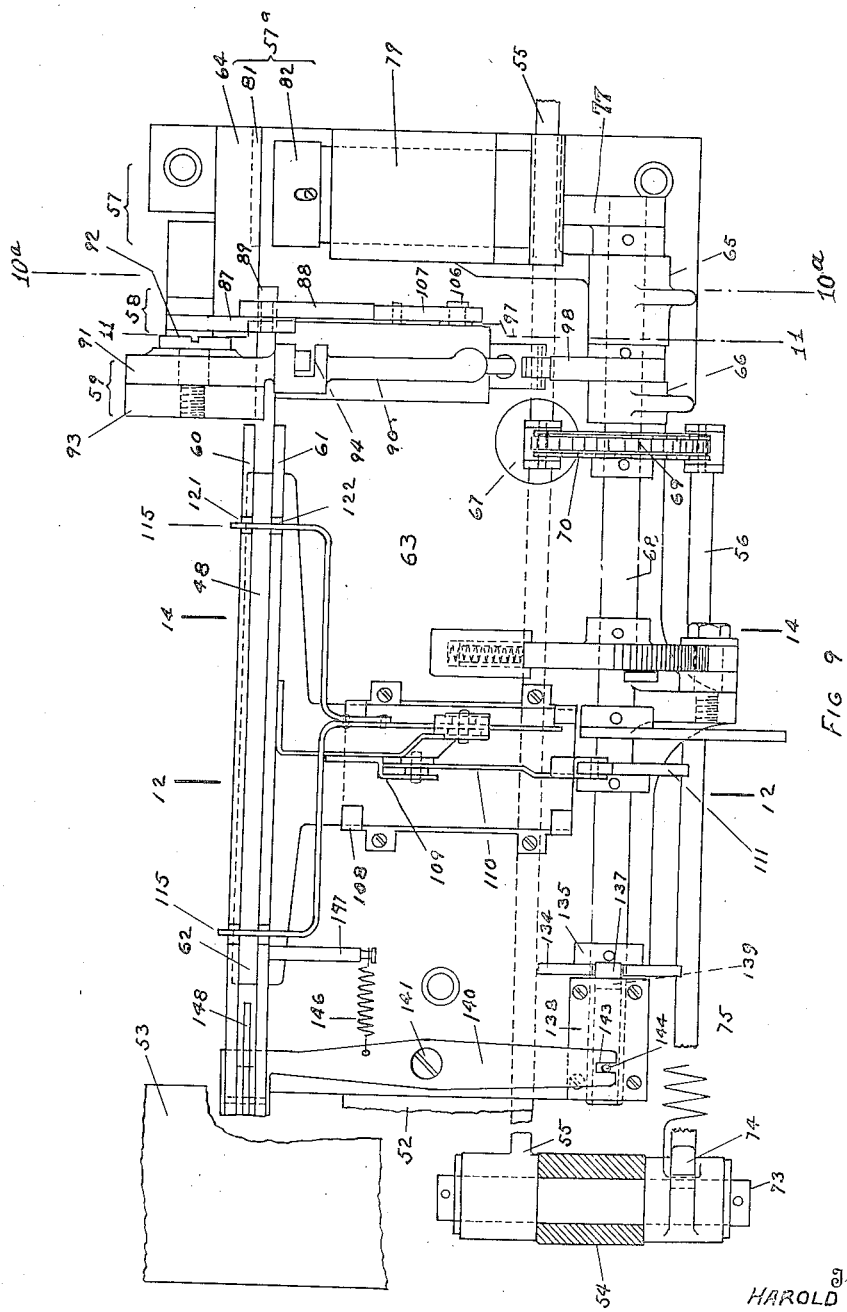

Aug. 26, 1924.

H. B. KLINE 1,506,491

DEPOSIT RECEIVING MACHINE

Filed May 12, 1922

Inventor
HAROLD B. KLINE.

By Martin & Rendell
Attorneys

Aug. 26, 1924.
H. B. KLINE
1,506,491
DEPOSIT RECEIVING MACHINE
Filed May 12, 1922  9 Sheets-Sheet 5
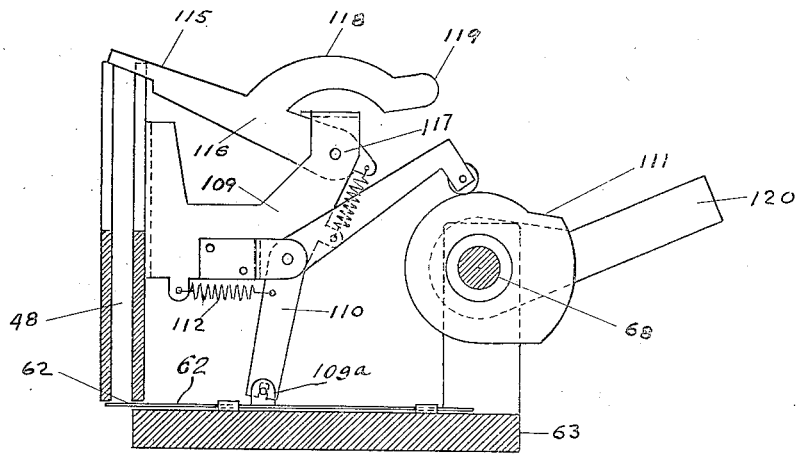
FIG 12
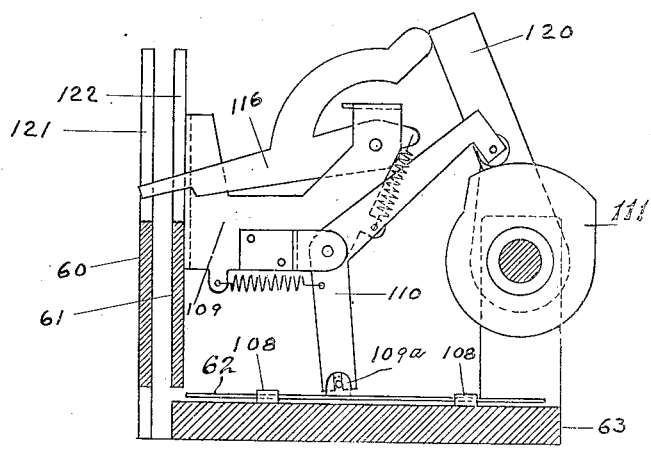
Fig.13.
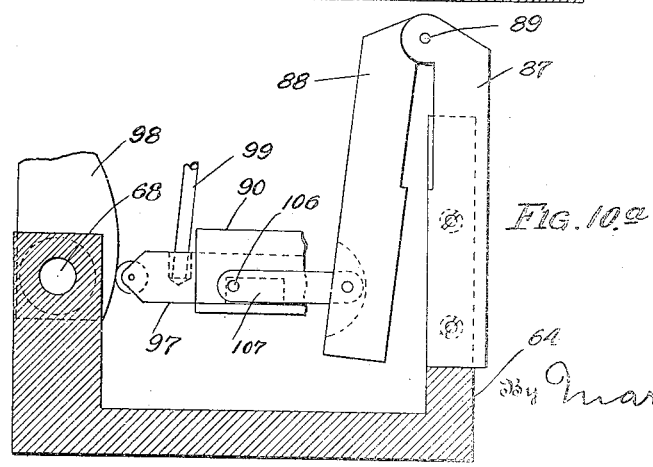
Fig.10.a
Inventor
HAROLD B. KLINE.
By Martin & Rendell
Attorneys Aug. 26, 1924.
H. B. KLINE
1,506,491
DEPOSIT RECEIVING MACHINE
Filed May 12, 1922   9 Sheets-Sheet 6
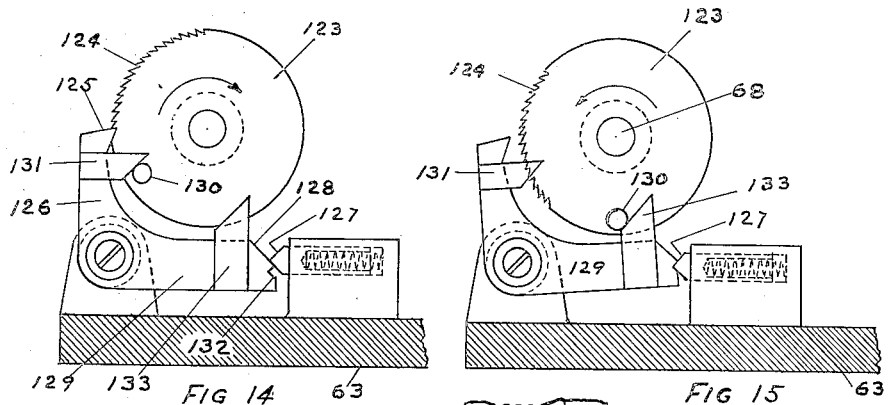
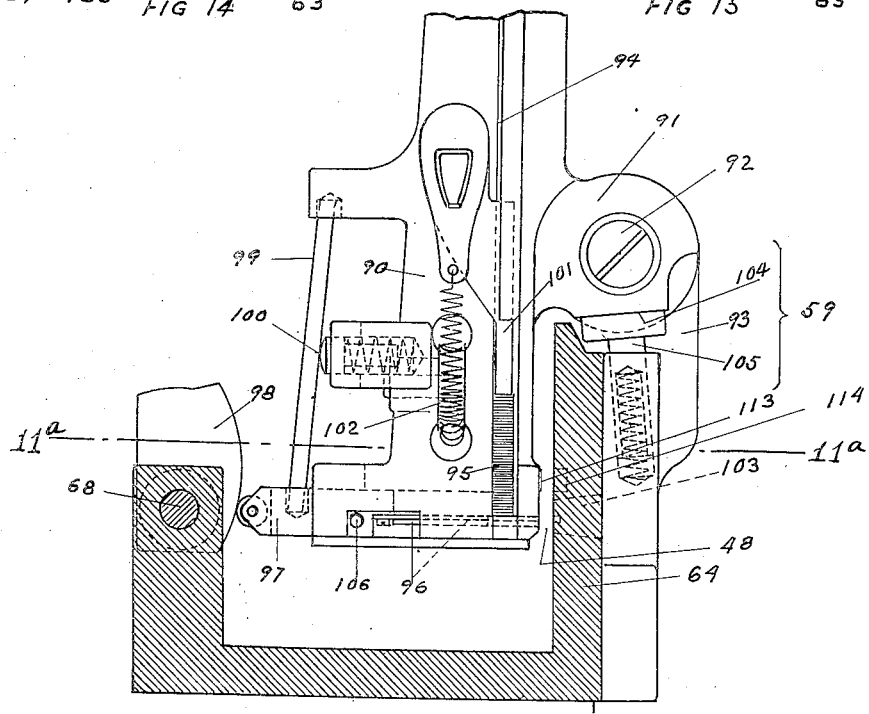
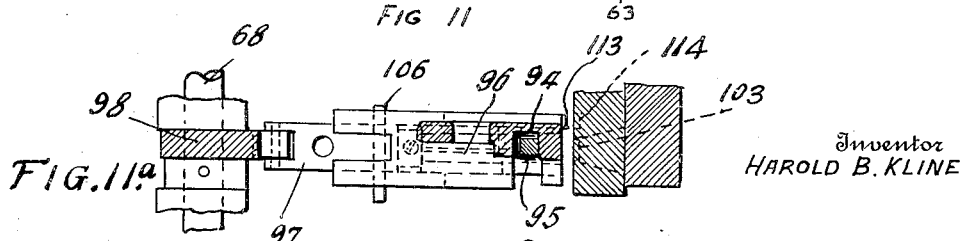
Inventor
HAROLD B. KLINE
By Martin & Rendell
Attorneys

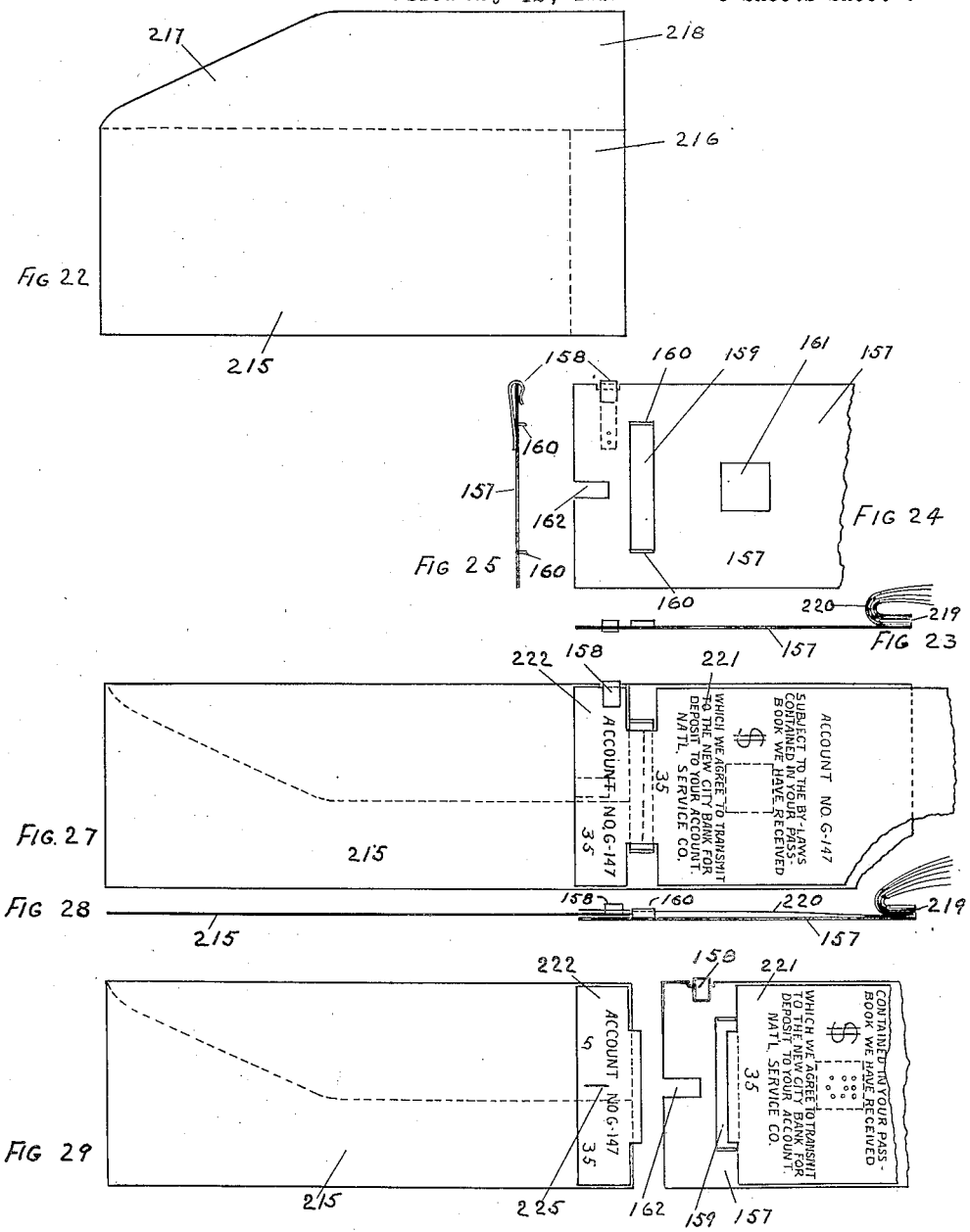

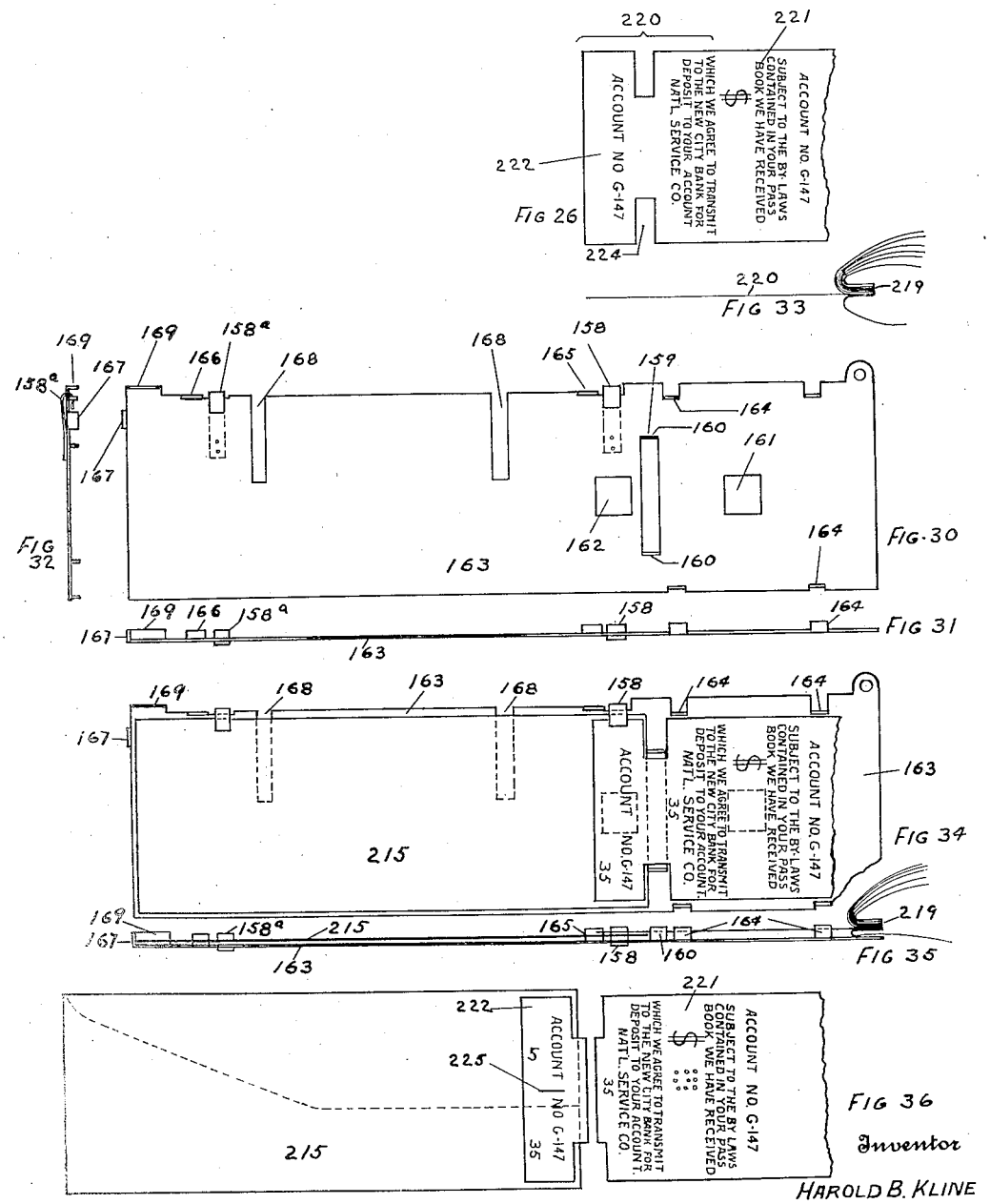

Patented Aug. 26, 1924.

1,506,491

UNITED STATES PATENT OFFICE.

HAROLD B. KLINE, OF UTICA, NEW YORK, ASSIGNOR TO NATIONAL AUTOMATIC TELLER CORPORATION, OF UTICA, NEW YORK, A CORPORATION.

DEPOSIT-RECEIVING MACHINE.

Application filed May 12, 1922. Serial No. 560,433.

*To all whom it may concern:*

Be it known that I, HAROLD B. KLINE, a citizen of the United States, and a resident of Utica, in the county of Oneida and State of New York, have invented certain new and useful Improvements in Deposit-Receiving Machines; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a machine for receiving deposits of money and more particularly of bank bills or other paper money in an envelope.

The purpose of my invention is to provide a machine and apparatus to be used in connection therewith for receiving deposits of money in an envelope and particularly deposits of bank bills or other paper money in an envelope which machine is of new construction and arrangement and is well adapted to perform the necessary functions under varying circumstances.

Further purposes are to provide a machine of the class described having one or more of the following advantages or features, namely: to provide convenient, safe and definite means for identifying each deposit received; to provide convenient, certain and definite means for giving the depositor a receipt for the amount of his deposit; to provide means for receiving deposits of varying amounts and giving a receipt according to the amount received; to provide means of fastening to the envelope receiving the deposit and identifying coupon which fastening means may also form supplemental means of closing the envelope so that it cannot be unsealed without giving evidence that it has been opened; to provide means for receiving an envelope having an outwardly extending tab thereon and for impressing upon the tab the receipt and then severing the receipt from the envelope; to provide a machine adapted to receive a deposit envelope and therewith a coupon preferably of double form and to fasten one part of said coupon to the deposit envelope as a means of identification and impress the receipt upon the other part and then sever the two parts of the coupon so that the depositor may receive the receipt while the deposit envelope passes into the safety receptacle of the machine; to provide means to grasp the deposit envelope or its tab or the coupon presented with the envelope at the beginning of the operation and hold the same until the receipting, fastening and severing operations have been performed so as to prevent the deposit being withdrawn after the receipt has been given therefor and to prevent injuring or straining the machine by such irregular operations; to provide means for initially locking the units from operation until the deposit envelope has been placed in proper position; and to have said locking means rendered inoperative or unlocked by the deposit envelope or the carrier or holder thereof coming to inward or operative position; to provide means for preventing the reversal of operation of the machine until the steps incident to complete operation have been finished in order to prevent removal of a deposit after the receipt therefor has been given or rendered available; to provide a machine having a plurality of units each complete and separately operable whereby deposits of varying amounts may be received and appropriate and corresponding receipts given therefor; to provide a compartment to receive the deposit envelope in which compartment the envelope is retained until the necessary operations have been effected and then to provide means for causing the envelope to pass to the safety receptacle preferably by gravity but aided also if necessary by positive means; to provide a machine adapted to receive both original deposits and regular or subsequent deposits and to give a proper receipt in each case; to provide a machine that will operate upon the introduction thereinto of the proper envelope either alone or accompanied by a holder or sliding carrier.

Fig. 9 is a top or plan view of one of the operating units on a still further enlarged scale with parts of the device broken away to more clearly show certain details.

Figure 10:
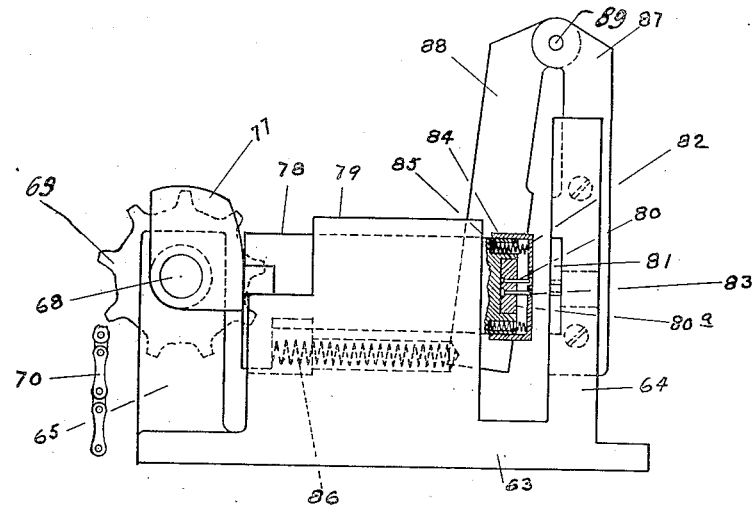
Fig. 10 is a front elevation of the receipt-impressing mechanism showing the front end of plunger in vertical section and showing jaws of the severing mechanism therebeyond partly in dotted outline.

Fig. 10$^a$ is a vertical sectional view on line 10$^a$—10$^a$ of Fig. 9 showing the severing mechanism and the means for operating the same.

Fig. 11 is a sectional view through the base plate 63 on line 11—11 of Fig. 9 showing a front elevation of the fastening mechanism with the severing mechanism removed.

Fig. 11$^a$ is a horizontal sectional view on line 11$^a$—11$^a$ of Fig. 11.

Fig. 12 is a vertical sectional view on line 12—12 of Fig. 9 showing in side elevation as seen from the rear the mechanism for withdrawing the floor or bottom from beneath the envelope-receiving compartment and also therebeyond the mechanism for positively pressing the deposit envelope downward from the compartment, parts of said mechanism being shown in normal or at rest position, that is with the floor plate in place at the bottom of the compartment and with the arms that are to press the envelope down in raised position so that the envelope may enter the compartment.

Fig. 13 is a vertical sectional view of the parts shown in Fig. 12 after both of the said mechanisms have been operated so as to withdraw the floor plate from below the floor of the compartment and move the arms down to press the envelope from the compartment.

Fig. 14 is a vertical sectional view on line 14—14 of Fig. 9 showing in side elevation as seen from the front the mechanism for preventing reversal of the operating means of the machine after its operation has been begun, the parts being shown in the position they occupy just before completion of the forward or operating movement of the machine.

Fig. 15 is a similar view of said mechanism just before completion of the backward or restoring movement of the operating parts of the machine.

Figure 16:
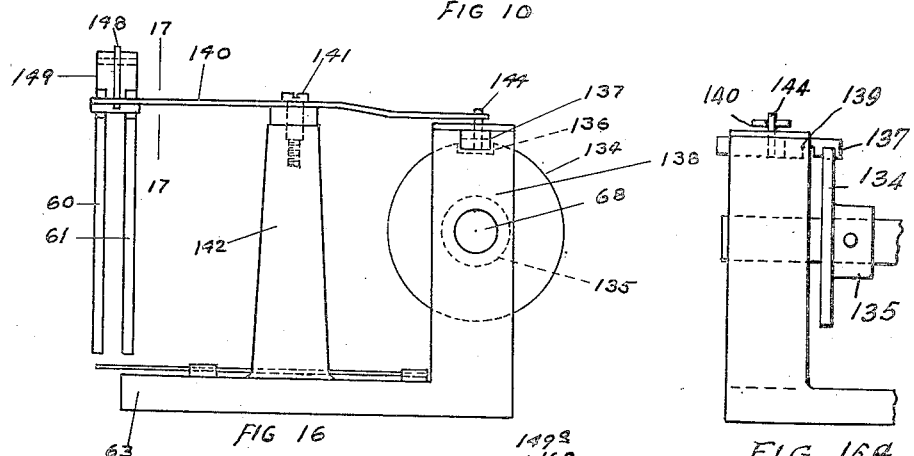

Fig. 16 is a rear elevation of the mechanism whereby the means for operating the machine are locked from operation until affirmatively unlocked by the deposit envelope or the holder carrying the deposit envelope having been moved into the compartment to proper position for the other operations upon the envelope to begin.

Fig. 16$^a$ is an edge view of the locking disk 134, locking bolt 137 and connected parts as seen from the right hand side of Fig. 16.

Figure 17:
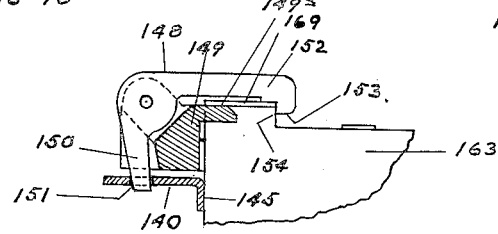

Fig. 17 is a vertical sectional view on line 17—17 of Fig. 16 showing in side elevation the means for locking the sliding holder from premature withdrawal.

Figure 18:
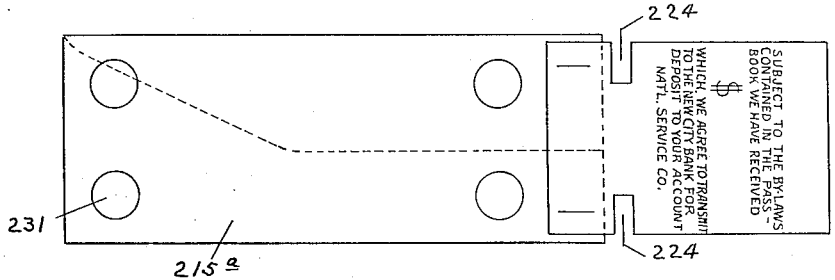

Fig. 18 is a plan view of an envelope having a very long outwardly extending tab and adapted to be used with the machine in making initial deposits including thereby deposits where the depositor does not have a bank book of coupons as hereinafter mentioned.

Figure 19:
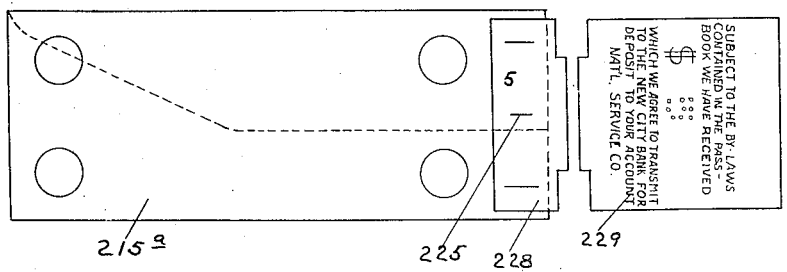

Fig. 19 is a view of the same envelope after the receipt has been impressed upon the outer part of said tab and said receipted portion severed from the rest of the envelope.

Figure 20:
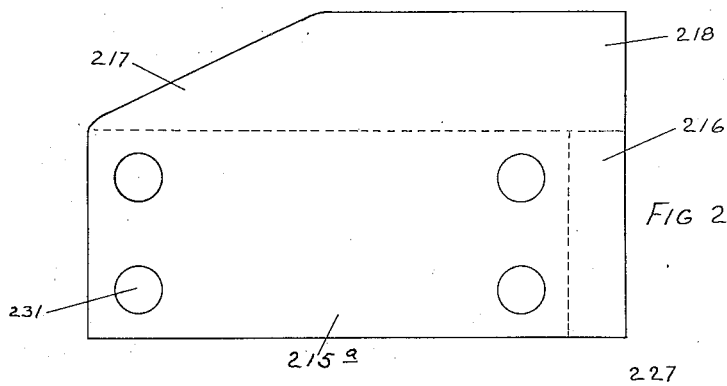
Figure 21:
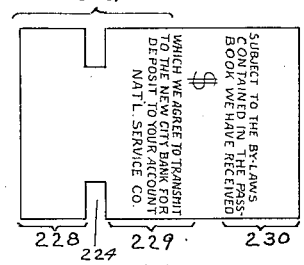

Figs. 20 and 21 show a convenient form of making the envelope proper and the very long tab to be affixed to said envelope in order to produce the initial deposit envelope shown in Figs. 18 and 19.

Fig. 22 is a plan or front view of an envelope adapted to be used in the machine for subsequent, that is regular, deposits meaning thereby deposits made when the depositor has a coupon or bank book with a plurality of coupons to present in connection with said deposit envelope.

Fig. 23 is an edge view of one form of a bank book having separate leaves which are coupons to be used in connection with the envelope shown in Fig. 22.

Fig. 24 is a plan view of said bank book showing especially its one stiff cover which forms a holder to grasp the tab of the regular envelope and also to hold one page of the bank book in alignment with said envelope and thereby form the means for inserting the envelope into the compartment of the machine and holding the outer part of said coupon page over-lapping the short outwardly extending tab of the regular envelope until said over-lapping coupon has been fastened to the envelope or its tab and the remaining portion of the coupon page impressed with a receipt and severed from the identifying coupon attached to the envelope.

Fig. 25 is an end edge view of said cover of the bank book.

Fig. 26 is a plan view of one of the coupon pages of the bank book shown in Figs. 23 and 24.

Fig. 27 is a plan view of a regular envelope, said holding cover of the bank book and one coupon page as the parts are held by the cover preliminary to and while being inserted in the machine.

Fig. 28 is an edge view of the parts shown in Fig. 26.

Fig. 29 is a plan view of the parts shown in Fig. 27 after the identifying coupon has been attached to the envelope tab and the receipt impressed upon the coupon remaining with the book and the two parts of the coupon severed and the bank book withdrawn slightly from the envelope.

Fig. 30 is a plan view of another form of holder being a sliding holder used in connection with the machine in order to enable the machine to receive deposits in much thinner envelopes.

Fig. 31 is a bottom edge view of said holder.

Fig. 32 is a view of the inner end of said holder.

Fig. 33 is an edge view of a bank book adapted for use with this form of holder and showing a single coupon page extending straight out from its binding in position to be placed upon said holder.

Fig. 34 is a plan view of said holder or sliding carrier with an envelope and coupon page in position thereon.

Fig. 35 is a bottom edge view of said holder and contents.

Fig. 36 is a plan view of the envelope and coupon page from said carrier after the identifying coupon has been attached to the envelope and the receipt impressed upon the portion of the coupon to be retained in the book by the depositor and showing said receipt severed from the identifying portion of the coupon.

The machine has an outer casing 40 the lower part of which is formed as or contains a safe or safety receptacle 41 which has a door 42 preferably at the front provided with a combination lock 43. The space within the safety receptacle will preferably be divided into chamber 44 by vertical partitions 45 extending from front to back. In the top of the safety receptacle are a plurality of openings 46 corresponding in number to the chambers 44 and each leading to its respective chamber. From each opening 46 there extends upwardly in the cavity of the casing 40 a chute 47 leading to the envelope-receiving compartment 48 of one unit 49 of the deposit-receiving mechanism proper.

As the machine illustrated in the drawings is constructed it is composed of four such units arranged side by side so that envelopes 115 or 115ª containing the bank bills or other paper money to be deposited may be inserted through vertical slots 51 in the front of the casing 40 a little distance above the safety receptacle and pushed from front to rear of the machine into the envelope-receiving compartments 48 of the respective units 49. Said compartments 48 are appropriately shaped to receive an envelope having therein an unfolded bank bill, with the envelope vertically arranged and standing on its bottom long edge.

The purpose of having the plurality of units 49 is to adapt the machine to receive, and give receipts for, deposits of varying amounts. The machine as illustrated and described is intended to have one unit receive deposits of one dollar, one unit receive deposits of two dollars and one unit receive deposits of five dollars and one unit receive deposits of ten dollars and said respective units are appropriately labeled or indicated and are adapted to impress a receipt of the said respective amounts upon envelopes received into each deposit-receiving unit. It is obvious that the number of units may be increased or decreased or the amounts to be received and receipted therefor changed as desired. As the units are similar in mechanical construction except as to the amount that is to be impressed on the receipt, a detailed description of one unit will be sufficient.

Each unit 49 is supported in the main upon a strong wide support 52 extending from front to rear of the casing 40 a little distance above the top of the safety receptacle. The four supports 52 are connected towards the rear of the machine by a cross piece 53 which affords means for suspending the bracket 54 upon which are pivotally supported the rear ends of the operating levers 55 and returning levers 56.

As the units are organized the envelope-receiving compartment 48 is at the right of the unit as viewed from the front of the machine and is immediately back of the slot 51 in the casing 40. The envelope-receiving compartment 48 extends through the receipt-impressing mechanism 57, the grasping mechanism 57ª, the severing mechanism 58 and the mechanism 59 for attaching a fastener to the envelope or the envelope and coupon and extends to the rear of said mechanisms the necessary distance between right and left hand walls 60 and 61 respectively. The portion of the envelope-receiving compartment between the walls 60 and 61 is over one of the chutes 47 leading to one of the openings 46. Between said walls and said chute, however, is interposed a sliding floor 62.

Upon the forward end of the base plate 63 of the unit there is provided a right hand upright 64 and two left hand uprights 65 and 66, the upright 65 being at the front of the unit and the upright 66 a little ways back. In the two left hand uprights 65 and 66 is mounted the main shaft 68 of the unit a partial rotation of which produces an operative movement of the different main mechanisms of the unit. To the rear of the upright 66 there is secured to the shaft 68 a toothed wheel 69 over which a chain 70 extends the lower right hand end of which after passing down through an aperture 67 in the base plate 63 is fastened to the operating lever 55 while its lower left hand end is fastened to the returning lever 56. The operating lever 55 has its forward end project out through a vertical slot 71 in the front of the casing 40 and is there provided with a handle 72 for operating the lever and thereby the mechanism of said unit. The rear end of said operating lever is rotatively mounted upon one end of a stub shaft 73 mounted in the bracket 54 already described as depending from the cross piece 53. On the other end of the stub shaft 73 is rotatably mounted the inner end of the returning lever 56 the forward end of which is connected to the left hand lower end of the chain 70. From the rear end of the returning lever 56 projects upward a short arm 74 to which is secured the rear end of a spring 75 the forward end of which is secured to a hook 76 provided upon or rigidly secured to the lower surface of the base plate of the unit. Spring 75 is at all times under tension whereby the forward end of returning lever 56 draws down its end of chain 70 and thereby in an obvious manner reverses the movement of the main shaft 58 after each operation of the machine and thereby raises the operating lever and handle to upward position ready for the next operation of the machine. It will be understood that the arrangement of parts is such that downward movement of the operating handle 72 rotates the main shaft in a clockwise direction as seen from the front of the unit. Downward or operating movement of the operating lever 55 of course is made against the yielding tension of spring 75.

The receipt-impressing mechanism 57 is constructed and operates as follows: Upon the main shaft 68 is fastened a cam 77 which takes against and presses towards the right as seen in Fig. 10 a plunger 78 slidingly mounted for horizontal movement in a housing 79 upstanding from the base plate 63. Upon the right hand end of the said plunger 78 are mounted the receipt-impressing perforators or punches 80 outwardly projecting from a base block 80ª removably secured to said end of the plunger. These perforating punches are arranged in such number and shape as to perforate the paper opposite thereto in a form to indicate the words or figures necessary to complete the receipt such for instance as the numeral 5 about as indicated in Figs. 19 and 36. In the opposing face of the upright 64 opposite the perforators 79 is removably secured the correspondingly recessed die 81 to receive the perforating punches 80 in the manner usual to such impressing or perforating devices. To the right hand or forward end of the plunger 78 is slidingly fastened the stripping and pressure cap 82 which normally extends out from said end of the plunger some distance and opposite the perforating punches 80 is provided with an aperture or apertures 83 to allow the perforators to pass through said cap 82.

Said cap 82 has a flange 84 slidingly fitting about the sides of the plunger to keep the cap in place. The cap is normally but yieldingly held a short distance beyond the end of the plunger by springs 85 let into recesses in the front end of the plunger and bearing against the inward surface of the cap 82. A spring 86 let into a recess in the housing 79 and bearing against an ear on the rear end of the plunger 78 operates to return the plunger to withdrawn position as soon as the cam 77 is retracted.

The pressure cap 82 as the active part of the grasping mechanism 57ª is normally in advance of the ends of the perforating punches 80 so that as the plunger begins its forward or operating movement the said pressure cap will be brought into spring-tensioned grasping engagement with the paper or envelope opposite thereto and press the same with sufficient tension between said cap and the die 81 to hold the envelope and coupon or other paper in place in the envelope-receiving compartment during all of the other movements of the machine and against premature removal of the envelope or coupon by the depositor.

This said grasping mechanism continues to operate until after the punches 80 have gone forward and done their work and until after the severing mechanism hereinafter described has completely performed its function. The cap 82 also operates to yieldingly strip the envelope or coupon perforated by the punches 80 from the said punches as the plunger 78 makes its return motion and allows the said cap to return to normal position in advance of said punches. In this way any danger of the receipt being held upon the perforators 79 is avoided and any damages to the said punches by a depositor pulling outward upon the receipt is obviated. It will be noted that the cam 77 and the plunger 78 operate the receipt-impressing mechanism 57 and the grasping mechanism 57ª.

To the rear of the receipt impressing mechanism are mounted the two jaws 87 and 88 (Figs. 10 and 10ª) being the fixed and movable jaws respectively of a scissorslike severing or shearing device 58 the jaws of which are pivoted to each other at their upper ends as at 89, the fixed jaw 87 being secured to the upright 64. As the movable jaw 88 is moved to the right as seen in Figs. 10 and 10ª or for its operating motion by means hereafter described the movable jaw 88 will have its cutting edge moved past the cutting edge of the fixed jaw 87 thereby severing at that line the paper or coupon between the jaws of the severing mechanism.

Slightly to the rear of the severing mechanism 58 there is provided and located the fastening mechanism 59 adapted to apply a non-detachable fastener such as a small metal staple or wire loop and so fasten the identifying coupon to the envelope, said fastener also operating as supplemental means of sealing the envelope by passing through the flap of the envelope and the envelope proper and so preventing the unsealing of the envelope without giving plain indication that the envelope has been tampered with. This fastener applying mechanism may be of any desired form according to the particular style of fastener to be used.

As seen particularly in Fig. 11 the fastening mechanism used comprises a head 90 most of which is to the left of the envelope-receiving compartment 48 but which has a hub 91 extend over said compartment to the right thereof where the hub is pivotally mounted by a horizontal screw 92 upon an ear 93 upstanding from upright 64. Upon the head is formed a long guideway 94 in which are placed a lot of the U-shaped wire fasteners or staples 95 each in horizontal position and adapted to have the lowermost one fed forward or to the right by the forward movement of the thin tongue 96 secured to plunger 97 slidingly mounted in the lower part of said head. The plunger is moved forward by cam 98 fixed on main shaft 68 and is retracted by a rod 99 the lower end of which is secured to said plunger while its upper end is connected to head 90 with its intermediate portion engaged by spring pressed plunger 100 mounted in the head. A follower 101 under tension from spring 102 keeps the staples pressed down in the guideway 94.

In the "receiving" position shown in Fig. 11 the head 90 is spaced away from the upright 64 and the anvil 103 mounted therein more than the thickness of the envelope or envelope and holder to be received into the envelope-receiving compartment 48 so as to give ample clearance for the insertion of said envelope or envelope and holder. During the driving of the staple through the envelope by the tongue 96 however, the head 90 swings bodily towards the anvil 103 to operating position so that the staple will move surely and completely go through the paper and have its ends clinched over on the farther side of the paper by the anvil 103. After the staple has been completely affixed and the cam 98 has been retracted the head 90 also swings back to "receiving" position so as to allow the envelope to readily fall from between the fastener affixing mechanism. The means for thus yieldingly holding the head in "receiving" position and returning it thereto from operative position comprises a flat surface 104 on the hub 91 of the head engaged by the broad flat top of spring-pressed plunger 105 mounted in the ear 93.

A pin 106 in the plunger 97 of the fastener-affixing mechanism projects towards the front of the machine and through link 107 with its forward end engaging and attached to the movable jaw 88 of the severing mechanism provides the means for advancing and withdrawing said movable jaw of the severing mechanism at each operation of the machine. It will be seen therefore that the cam 98 and plunger 97 operate the fastener affixing mechanism 59 and the severing mechanism 58.

The cam 98 and plunger 97 may also conveniently be utilized to effect an impression as a stamping or perforation on the identifying coupon attached to the envelope or envelope extension as a means of furnishing with the deposit an indication of what receipt was given therefor. In this way the bank or company receiving the deposit has a warning as to what the envelope should contain before breaking the envelope; in case of variance between the stamped indication of amount receipted for and the amount of the deposit revealed through the transparent envelope, the bank or person receiving the deposit has an opportunity to set aside the envelope without opening it and so show the depositor his unbroken envelope. As means for making such an impression there is provided a projecting impression stamp or perforating punch 113 (Fig. 11) upon the side of the head 90 towards the upright 64. Opposite this impression means 113 there is provided a corresponding die or anvil 114 as the case may be to assist in effecting the impression or perforation. Such impression will be formed upon the coupon attached or being attached to the envelope tab and incidentally to the envelope or envelope tab below the coupon as the staple-affixing head 90 is forced sharply against the coupon envelope as above described. As indicated in the drawing as in Figs. 29 and 36 this indication of amount may be a figure corresponding plainly to the amount punched by the receipt-impressing means already described or it may be an arbitrary letter or character which will give that information to the bank teller who knows the cipher without indicating the same to the collector of the deposits.

Sliding upon the base plate 63 of the unit between two opposite pairs of guiding lines 108 is provided and located the flat floor plate 62 (Figs. 9, 12 and 13) so as to slide at right angles to the envelope-receiving compartment 48 and having its end that way widened to form the floor 62 of said compartment. This floor 62 of the compartment is normally in place at the bottom of the compartment as indicated in Fig. 12 so as to support the envelope but is adapted to be withdrawn from beneath the compartment as indicated in Fig. 13 to allow the envelope to drop or be forced downward from the compartment.

Upon a bracket 109 extending from wall 61 is pivoted a bell crank 110 the lower arm of which is connected to the lugs 109ª upstanding from floor 62 while the upper arm of the bell crank is moved by cam 111 fixed to main shaft 68 whereby said cam operates to withdraw the floor 62 after the severing mechanism receipt-impressing mechanism and fastener affixing mechanism have performed their functions and keep said floor withdrawn long enough for the envelope to fall. When the high part of cam 111 is withdrawn from the bell crank 110 a spring 112 connecting the lower arm of the bell crank to the bracket returns the floor to normal or supporting position.

The means for positively striking or forcing the deposit envelope down from the envelope-receiving receptacle 48 into the chute 47 comprises the widely spaced forked ends 115 of a lever 116 pivoted as at 117 to the bracket 109. Intermediate its ends the lever 116 has an upwardly extending arm 118 which curves back over the pivoting point 117 of the said lever so that the end 119 of the arm 118 may be engaged and pushed to the left as seen in Fig. 12 by arm 120 projecting from the main shaft 68. As the main shaft 68 is given its partial rotation for the operating stroke it will be obvious that the forked ends 115 will travel sharply down through slots 121 and 122 provided in the walls 60 and 61 respectively. It will be understood that the means here described for pushing the deposit envelope from the compartment 48 will be timed so as not to strike an envelope until after the floor 62 is removed therefrom but that these means for striking the envelope will be primarily a safeguard against envelopes accidentally sticking in the compartment.

In order to safeguard the machine and the bank or persons standing back of the receipts given thereby I provide the machine with means to prevent the operating handle and operating means from being reversed after movement thereof has once started until the operating movement is completed.

This mechanism obviates any possibility of withdrawing a deposit from the machine after it has been inserted therein and the receipt given or partly impressed upon the depositor's coupon book. The mechanism also prevents premature withdrawal of the deposit or deposit receipt through the depositor not completing the operating movement of the handle for the reason that until the handle is moved entirely down it cannot be reversed and that will be a sufficient indication to the depositor that the deposit operation is not completed, especially as until the handle is reversed by the spring heretofore mentioned the depositor's receipt will be still grasped by the grasping means heretofore described.

Means for thus preventing a premature reversal of the operating means comprises a toothed wheel 123 fixed upon the main operating shaft 68 and the co-operating parts shown in Figs. 14 and 15 which are side elevations of said mechanism as seen from the front.

Part of the periphery of the wheel 123 is provided with teeth 124 pointing to the left as indicated in said figures that is so that the ratchet 125 on bell crank 126 will ride over said teeth as the wheel 124 is making its operative movement but will in an obvious manner prevent reversal of said wheel and thereby of said main shaft through said ratchet 125 engaging the flat face of the last tooth passed in case reversal is attempted. It will be understood that the ratchet 125 is during operative movement of the main shaft yieldingly pressed against said wheel through spring pressed plunger 127 engaging a slanting or cam face 128 on the other arm 129 of the bell crank 126. As the parts come to the position shown in Fig. 14 which is the position just before completion of the operating movement a pin 130 on wheel 125 strikes a finger 131 on the ratchet arm of the bell crank 126 and forces the ratchet end 125 of the bell crank 126 to the left against the tension of the plunger 127 enough so that the point of said plunger will engage the notch 132 in the end of arm 129. As a result of this movement the main shaft 68 and therewith the tooth wheel 123 may be reversed without the ratchet 125 engaging teeth 124 until the reversing movement of the main shaft is almost complete. At that instant as shown in Fig. 15 the pin 130 is again moved to the right and now strikes a finger 133 upon the arm 129 which depresses the said arm 129 against the tension of the plunger 127 and allows the ratchet 125 to again engage the teeth and so return the parts to normal or at rest position ready for the next operation of the machine.

In order to prevent a misoperation of the machine and thereby a mutilation of the money or a failure to make the proper operations in a proper place upon the envelope or coupon book means are provided to normally lock the machine from operation until the envelope has been shoved into the machine to its proper position for the machine to begin operation and also means are provided for the envelope or the holder automatically unlocking said means when the envelope or envelope holder comes to such proper inward position. Such locking means comprises a clutch positively locking the main shaft 68 from operation when the machine is at rest and mechanism for unlocking said clutch which mechanism includes a part located in or near the inner end of the envelope-receiving compartment 48 to be engaged by the envelope or envelope holder when it comes to inward position.

Said clutch consists of a disk 134 (Figs. 9, 16 and 16ª) the hub 135 of which is fastened to main shaft 68. In the periphery of the disk 134 is a notch 136 normally occupied by bolt 137 slidingly mounted in housing 138 whereby it will be seen the bolt normally locks the disk 134 and thereby the main shaft from rotation. As the parts are seen in Fig. 9 to the left of the portion of the bolt normally in the notch 136 (Fig. 16) is a recess 139 (Fig. 16ª) of a width lengthwise of said bolt 137 equal to the thickness of the disc 134. It will now be seen that by sliding the bolt 137 to the right as the parts are seen in Fig. 9 until the notch 139 is in alignment with the disc 134, said disc will no longer be locked from movement and that thereby the main shaft and all the mechanisms operatively connected thereto will be free to operate. As means for so moving the bolt 137 to the right by the envelope or envelope holder, there is provided a lever 140 pivotally mounted as at 141 upon the top of a post 142 upstanding from the base plate 63 of the unit. One end of said lever 140 has a slot 143 into which extends a pin 144 upstanding from said bolt 137. The other end of said lever 140 projects into the inner end of the envelope receiving compartment 48 and is there provided with a down-turned flange 145 (Fig. 17) which will be engaged and moved to the left or inwardly of the said compartment 48 as the deposit envelope or the holder containing the envelope is shoved to proper inward position in said compartment. Movement to the left by the part of the lever 140 engaged by the envelope or envelope holder moves the bolt 137 to unlocked position. A light coiled spring 146 has one end connected to lever 140 and its other end connected to a suitable fixed bracket 147 tends to return the bolt 137 to locking position as soon as the envelope or envelope holder is removed from contact with the lever 140, and does so as soon as the operating shaft and disk 134 return to normal position. In order to lock the envelope holder 163 in inward or operating position after it reaches such a position, there is provided a bell crank 148 pivoted upon a suitable bracket 149 and having its downwardly extending arm 150 extend into a hole 151 in the end of lever 140 near the compartment 48, while the other end 152 of said lever has a downwardly extending hooked end 153 which is moved downward to engage an upstanding shoulder 154 on the upper edge of the holder 163. It will now be seen that as the envelope 163 is moved to inward or operating position, the end of lever 140 engaged by said holder will move the hook 153 downwardly so as to engage shoulder 154. After the envelope is pushed from the compartment 48 and the operating shaft and therewith the disk 134 are reversed to normal position lever 140 is free to turn to its normal position under the tension of spring 146 and such movement of lever 140 in obvious manner raises the hooked end of the bell crank 148 and so releases the envelope holder 163.

Under some circumstances it is an advantage to have the receipts received by the depositor indicate the individual machine which gave the receipt.

This is done by having the receipt impressing means also add to the receipt an extra mark or perforation such as the extra perforation below the receipt numeral 5 on the receipt shown in Fig. 36. The number and arrangement of such extra perforations by an obvious code arrangement will afford means for positively identifying the machine which gave any particular receipt. This extra perforation is readily obtained by adding an extra perforator or punch 80 in the receipt impressing mechanism 57.

As the various forms of envelopes and of deposit books used with this machine are the subject matter of another application filed by me for United States Letters Patent and are particularly described in that application, I will describe the said envelopes and deposit books in this application only enough to illustrate the operation of the machine.

Fig. 18 is a plan view of one form of envelope 215ª especially adapted for use in making an initial deposit or deposits where the depositor does not have a deposit book or coupon book as hereinafter mentioned. This envelope is formed of sufficient size to hold a bank bill unfolded and is either entirely transparent or transparent at sufficient windows 231 to allow the denomination of any bank bill to be readily seen. As seen in Fig. 20 the envelope proper has an ordinary flap 217 along one long edge of the envelope and a short tab 216 at what I will call the outer end of the envelope and an extension flap 218 extending from the usual triangular flap 217 into line with the end of tab 216. The tab 216 is made solid or with the two layers of the envelope gummed together so as not to be occupied by the bank bill and has rigidly fastened thereto the extension tab 227, of which the portion 228 overlaps the tab 216, while its middle portion 229 has formed thereon the wording (about as indicated) for a receipt, to be completed by the receipt impressing mechanism. The outer part 230 of the long tab 227 forms a handle for shoving the deposit envelope into the machine and for withdrawing the receipt 229 from the machine after the machine has completed its full operation.

Assuming a deposit is made by means of one of these initial deposit envelopes 215ª the desired bill in unfolded condition is placed in the envelope and the flap 217 sealed to the back of the envelope in the usual way. The envelope is then thrust money end first through the appropriate slot 71 into the envelope-receiving compartment 48 of the unit of the machine, adapted to receive deposits of the denomination of the bill placed in the envelope; it being understood of course that the slots 71 and the adjacent handles will be plainly marked to indicate the denomination intended to be received thereby.

As the envelope comes to inward position in the compartment 48, the envelope engages the flange 145 of lever 140 and moves said lever sufficiently to unlock the disc 134 and so allow the unit of the machine to be operated. This is accomplished by the depositor pressing down the handle 72 which will impart a partial rotation to main shaft 68. Rotation of said shaft as already described will bring into operation the grasping mechanism to hold the envelope from being prematurely removed, will cause the receipt impressing mechanism 57 to perforate the figure upon the receipt portion 229 of the long tab 227, will operate the fastening mechanism 59 so as to affix a staple at 225 to and through the portion 228 of the envelope and the short tab part 216 and the extension flap 218, will impress at the same time upon the part 228 of the tab an indication of the amount of the deposit corresponding to that upon the receipt and will operate the severing mechanism 58 so as to cut the receipt 229 and handle thereof 230 from the envelope 215ª containing the deposit, will withdraw the sliding floor 62 from below the envelope compartment 48 allowing the envelope to fall through the chute 47 below that unit into the chamber 44 below said unit and will move the forked ends 115 sharply down through the envelope-receiving compartment 48 to dislodge the envelope if it happens to have become caught in the compartment.

After the depositor has inserted his deposit in the machine and started the operating lever on its downward course reversal of the lever before it reaches its complete downward movement is prevented by the mechanism shown in Figs. 14 and 15 already described in detail. As the means including the cap 82 for grasping the envelope are the first to come into operation and the last to be released, it will be apparent that the envelope will be held securely in place until the complete operating movement of all the mechanisms is performed.

Figure 1:
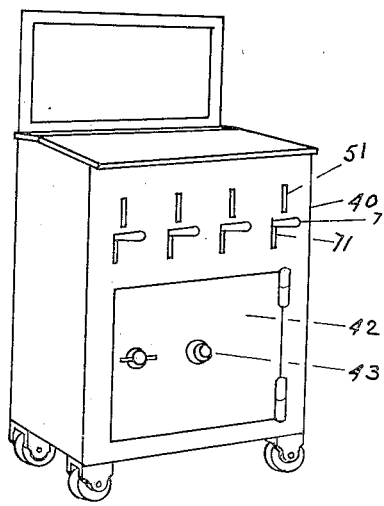
Fig. 1 is a perspective view of a deposit-receiving machine embodying my invention.
Figure 2:
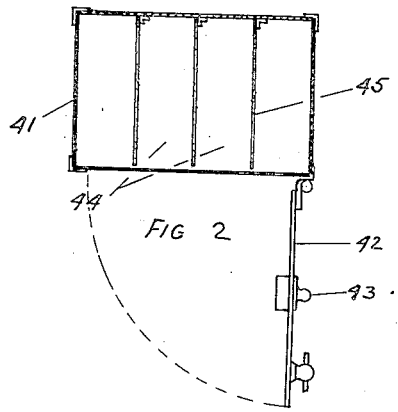
Fig. 2 is a horizontal sectional view through the lower part or safety receptacle of the machine.
Figure 3:
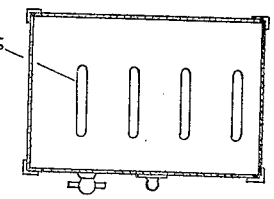
Fig. 3 is a top view of the safety receptacle showing the plurality of openings in the top thereof.
Figure 4:
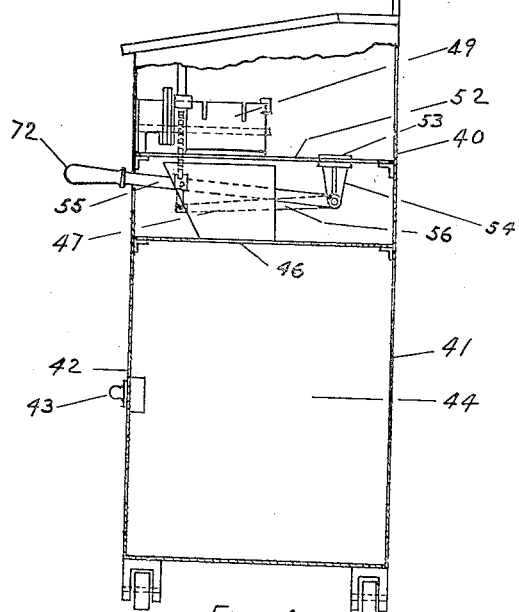
Fig. 4 is a vertical sectional view through the machine showing one of the openings into the safety receptacle, the chute leading to said opening and one of the units in side elevation.
Figure 5:
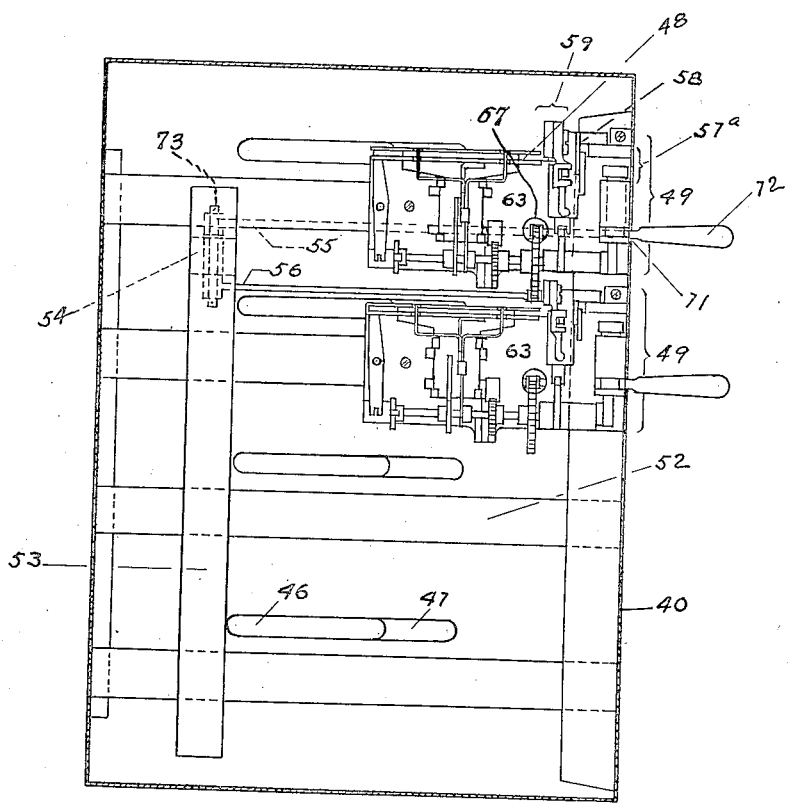
Fig. 5 is a top view of the machine on an enlarged scale with the top or cover removed and with two of the four units of the machine also removed.
Figures 6, 7, 8:
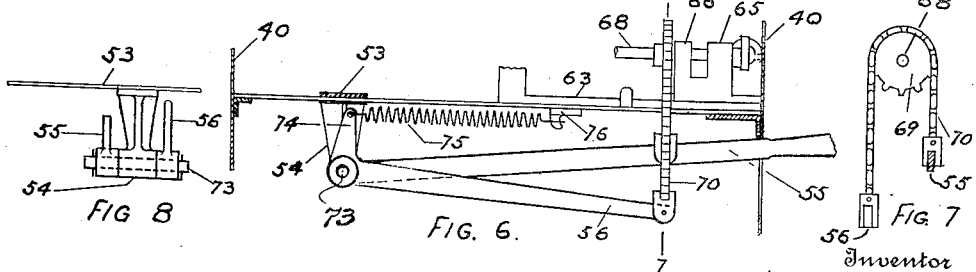
Fig. 6 is a side elevation of the means for operating one of the units of the machine.
Fig. 7 is a detailed sectional view on line 7—7 of Fig. 6 as seen from the front.
Fig. 8 is a rear elevation of the bracket supporting the rear end of the operating lever and returning lever.

Upon the operator releasing his hold upon the handle 72 after completing the operating movement, the spring 75 and its attached parts including the chain 70 particularly shown in Figs. 6, 7 and 8 will at once reverse the main shaft 68 and move it back to original or starting position. Such a reverse movement of the main shaft particularly operates to allow the sliding floor 62 to move back to position under the envelope-receiving compartment 48 and to move the arms 115 up from said compartment, thereby allowing another deposit envelope to be placed in the compartment. The reverse movement of said main shaft also in obvious manner will separate the jaws of the severing mechanism and withdraw the perforating punches from the receipt and finally withdraw the grasping cap 82 from engagement with the receipt, whereupon the receipt may be removed from the machine by the depositor.

The deposit receiving machine herein described however, is particularly intended for use in a more complicated proceeding than that of receiving initial deposits as above described. In other words my machine is especially adapted to receive deposits where the money is placed in unfolded condition in an envelope such as shown in Fig. 22 and with the envelope is presented a two part coupon such as shown in Fig. 26, one part of which coupon is fastened to the envelope containing the deposit as a means of identifying the deposit while the other part of the coupon is impressed with a character completing a receipt printed upon that part of the coupon and adapted to be retained by the depositor as a means of indicating ownership of the deposit made by him.

Preferably these two part coupons will be the different pages 220 of a deposit book 219, edge views of two forms of which books are shown in Figs. 23 and 33. Of these pages 220 the right hand part is the receipt coupon 221 and has printed thereon the form of the desired receipt about as indicated in Fig. 26 with a blank space left to receive the punched numeral to indicate the amount of the receipt. Both the receipt coupon 221 and the identifying coupon 222 have the characters or numbers thereon identifying the coupon book or bank book 219 of that depositor such as the words "Account

G147." Both coupons will also preferably have a number to indicate the separate coupons or deposits to be made by the book such as the number 35 appearing in Fig. 27. The envelope 215 shown in Fig. 22 and a double coupon as one page 220 are arranged with the coupon 222 overlapping the tab 216 of the envelope 215 as indicated in Figs. 27 and 34. Means for so arranging and holding the envelope and coupon page and placing the envelope and double coupon to the machine may be of various forms.

One form of such holder is shown in Figs. 23, 24, 25, 27, 28 and 29 and consists of forming the coupon book 219 with a stiff cover 157. This stiff cover is of the full length of the double coupon page 220 and has near its outer end overlapping its top edge a spring clip 158 adapted to hold the envelope 215 and one of the pages 220 in proper overlapping and aligned position as indicated in Fig. 27 by said clip 158 engaging the identifying coupon 222 and the tab 216 of the envelope and pressing them close together against the said holder 157. Upon this holder 157 there is formed a little ways from its outer end a tranversely extending slot 159 to allow the jaws of the severing mechanism already described to sever the receipt coupon 221 from the identifying coupon 222 along the dotted line between said coupons as shown in Fig. 27 and as shown severed in Fig. 29. The cover holder 157 is preferably formed of metal and at the end of slot 159 will be provided with forwardly extending ears 160 which operate as stops to locate the envelope 215 in proper position upon the holder 157. The cover holder 157 also has an aperture 161 opposite the portion of the receipt coupon which is to receive the receipt impression or perforations from the receipt impressing mechanisms already described. In its outer end the said cover holder 157 has a recess 162 opposite the part of the identifying coupon 222 that is to receive the staple 225. When the depositor has placed his deposit envelope against the stops 160 of the holder cover 157 and clipped the envelope and the identifying coupon 222 temporarily together under the spring clip 158, the envelope is inserted in the appropriate envelope-receiving compartment of the machine with the cover holder 157 and one page of the coupon book following the envelope into the machine until the envelope has come to proper position. The operation of the machine will then be as heretofore described with regard to the initial deposit envelope, with the addition that now the identifying coupon 222 will be stapled to the outer tab 216 of the envelope and the two coupons will be severed from each other as indicated in Fig. 29. The aperture 161 in the cover holder admits of the receipt impressing mechanism operating directly upon the receipt coupon and the slot 162 in the outer end of the cover holder admits of the fastening mechanisms securing the staple 225 through the coupon 222, the tab 216 and the extension flap 218. The deposit operation being completed and the main operating shaft 68 being returned to normal position the cover holder 157 of the coupon book 219 bearing the receipt just completed by the machine is withdrawn from the machine.

A better and the preferred form of means for holding a regular deposit envelope and a page of the coupon book is shown in Figs. 30 to 35. This holder 163 is preferably formed of sheet metal and is of a length equal to the combined length of the regular deposit envelope 215 and a page 220 of the coupon or deposit book 219 when placed in proper overlapping position as indicated in Figs. 34 and 35. This holder 163 however, is not a part of the coupon book, but is provided conveniently near the deposit-receiving machine as by being fastened thereto by a cord or chain. The holder 163 has on its portion to receive the receipt coupon 221 the aperture 161 for the perforating punches to work through in completing the receipt upon the receipt coupon. On the line between the receipt coupon 221 and the identifying coupon 222 this holder also has provided the long transversely extending slot 159 to allow the jaws of the severing mechanism to operate upon the page of the book without interference from the holder. Farther to the left this holder is also provided with the aperture 162 to allow the staple 225 to be affixed as already described. The left hand part of this holder supports the deposit envelope for its full length and breadth. Clip 158 is provided on this form of holder as on the other form to hold together the coupon 222 and the tab 216 of the envelope just above the point which is to receive the staple. Towards its outer end, this holder is provided with another similar clip 158$^a$, to help hold the envelope to the holder near the inner end of the envelope. Four forwardly projecting ears 164 arranged in two opposite pairs upon the right hand end of the holder 163 provide means for aligning the receipt coupon and also the identifying coupon 222 upon the holder. To the left of the spring clip 158 a forwardly projecting ear 165 is provided upon the upper edge of the holder and a similar projecting ear 166 is provided upon the upper edge of the holder near its outer or left hand end; these ears assure the depositor getting the deposit envelope in proper position laterally of the holder. A forwardly projecting ear 167 on the left hand end of the holder 163 near its upper edge and the forwardly projecting ears 160 at the top and bottom of the transverse slot 157 assure the proper positioning of the envelope upon the holder longitudinally. The holder 163 is provided with two deep slots 168 extending from the upper edge of the holder transversely thereof about half its width in order to allow the clearing arms 115 to pass downward through the envelope compartment 48 and shove the envelope from the compartment without said arms striking the holder 163.

It will now be seen that a depositor may very easily place his bank bill in one of the regular envelopes 215 shown in Fig. 22 and then place this envelope upon the long holder 163 as above described with one page 220 of his deposit book in alignment therewith as shown in Fig. 34. The holder carrying said deposit envelope and page of the deposit book is slid into the envelope-receiving compartment of the machine, it being understood that no part of the holder is too thick to prevent the holder and its contents being thus readily slid into the machine. The machine is then operated by simply pressing the handle of that unit of the machine and the different mechanisms will operate as already described in detail. Upon completion of the operating stroke of the machine, the envelope containing the money with the attached identifying coupon 222 passes downward into the safety deposit chamber and upon the completion of the reverse movement of the main shaft and operating lever, the holder 163 is withdrawn bringing therewith the completed receipt 221. The depositor then disengages the receipt from the holder 163.

The primary purpose of providing the holder 163 or 157 is to allow regular deposits, that is deposits after the first deposit to be made with a much smaller, simpler and cheaper envelope than the original deposit envelope. It will be noted that having provided the holder for use with such regular deposit envelope as 215 the holder 163 can be and will be ordinarily used even when the initial deposit envelope 215ª is to be used. It will be seen that the long extension tab 227 of the initial deposit envelope will simply occupy the position in the holder ordinarily occupied by the inner and outer coupons 221 and 222 respectively and with the portion 228 of said long tab 227 over the short tab 216.

Where the holder 163 is shoved into the envelope compartment 48, a forwardly projecting ear 169 (Fig. 17) on the upper edge of the holder near its left hand edge rides up onto a projection 149ª on bracket 149 and holds the envelope holder 163 up in position while the floor plate 62 is withdrawn and the envelope struck from the holder and until the floor plate is returned to normal position and until the main shaft is fully reversed to normal position.

It will be noticed that when one of the double coupon pages 220 is placed in the machine with a deposit envelope the small identifying coupon 222 will be ahead or will extend farther into the machine than the receipt coupon 221 resulting in the identifying coupon 222 being the inner coupon and the receipt coupon 221 being the outer coupon and this designation of the coupons by their position relative to the machine is used in the claims in this application.

What I claim as new and desire to secure by Letters Patent is:

1. A machine for receiving deposits comprising a safety receptacle having an opening thereinto, a compartment over said opening for receiving an envelope having an outwardly extending tab, mechanism for impressing a character indicating the amount deposited to complete a receipt upon a part of said tab and mechanism for severing said receipted part from the envelope whereby said receipt may be withdrawn by the depositor while the envelope containing the money passes into the safety receptacle.

2. A machine for receiving deposits comprising a safety receptacle having an opening thereinto, a compartment over said opening for receiving an envelope having an outwardly extending tab, mechanism for impressing a character indicating the amount deposited to complete a receipt upon a part of said tab, mechanism for severing said receipted part from the envelope whereby said receipt may be withdrawn by the depositor while the envelope containing the money passes into the safety receptacle and means including an element extending without the machine for operating said severing and said receipt-impressing mechanism.

3. A machine for receiving deposits comprising a safety receptacle having an opening thereinto, a compartment over said opening for receiving an envelope having an outwardly extending tab, mechanism for impressing a character indicating the amount deposited to complete a receipt upon a part of said tab, mechanism for severing said receipted part from the envelope whereby said receipt may be withdrawn by the depositor while the envelope containing the money passes into the safety receptacle, means including an element extending without the machine for operating said severing and said receipt-impressing mechanism and means for holding the receipt from being withdrawn until the envelope is severed therefrom.

4. A machine for receiving deposits comprising a safety receptacle having an opening thereinto, a compartment over said opening for receiving an envelope having an outwardly extending tab, mechanism for grasping said tab, mechanism for impressing a character indicating the amount deposited to complete a receipt upon a part of said tab, and mechanism for severing said receipted parts from the envelope whereby said receipt may be withdrawn by the depositor while the envelope containing the money passes into the safety receptacle, said grasping mechanism being first operative and continuing until the severing operation has been completed.

5. A machine for receiving deposits comprising a safety receptacle having an opening thereinto, a compartment over said opening for receiving an envelope having an outwardly extending tab, mechanism for grasping said tab, mechanism for impressing a character indicating the amount deposited to complete a receipt upon a part of said tab and mechanism for severing said receipted parts from the envelope whereby said receipt may be withdrawn by the depositor while the envelope containing the money passes into the safety receptacle, said grasping mechanism being first operative and continuing until the severing and receipting operations have been completed.

6. A machine for receiving deposits comprising a safety receptacle having an opening thereinto, a compartment over said opening for receiving an envelope having an outwardly extending tab, mechanism for grasping said tab, mechanism for impressing a character indicating the amount deposited to complete a receipt upon a part of said tab, mechanism for severing said receipted part from the envelope whereby said receipt may be withdrawn by the depositor while the envelope containing the money passes into the safety receptacle and means including an element extending without the machine for operating said grasping, said severing and said receipt-impressing mechanism.

7. A machine for receiving deposits comprising a safety receptacle having an opening thereinto, a compartment over said opening for receiving an envelope having an outwardly extending tab, mechanism for impressing a character indicating the amount deposited to complete a receipt upon a part of said tab, mechanism for severing said receipted part from the envelope whereby said receipt may be withdrawn by the depositor while the envelope containing the money passes into the safety receptacle and means for holding the receipt from being withdrawn until the envelope is severed therefrom.

8. A machine for receiving deposits comprising a safety receptacle having an opening thereinto, a compartment over said opening for receiving an envelope having an outwardly extending tab, mechanism for impressing a receipt upon a part of said tab, mechanism for severing said receipted part from the envelope whereby said receipt may be withdrawn by the depositor while the envelope containing the money passes into the safety receptacle including an element extending without the machine and a device for preventing the reversal of said mechanisms until all the said operations have been performed.

9. A machine for receiving deposits comprising a safety receptacle having an opening thereinto, a compartment over said opening for receiving an envelope having an outwardly extending tab, mechanism for grasping said tab, mechanism for impressing a receipt upon a part of said tab, mechanism for severing said receipted part from the envelope whereby said receipt may be withdrawn by the depositor while the envelope containing the money passes into the safety receptacle, means for operating said grasping, said severing and said receipt-impressing mechanisms and a device for preventing the reversal of said operating means until all the said operations have been performed.

10. A machine for receiving deposits comprising a safety receptacle having an opening thereinto, a compartment over said opening for receiving an envelope having an outwardly extending tab, mechanism for grasping said tab, mechanism for impressing a receipt upon a part of said tab, mechanism for severing said receipted part from the envelope whereby said receipt may be withdrawn by the depositor while the envelope containing the money passes into the safety receptacle, means including an element extending without the machine for operating said grasping, said severing and said receipt-impressing mechanisms, and a device for preventing the reversal of said operating means until all the said operations have been performed.

11. A machine for receiving deposits comprising a safety receptacle having an opening thereinto, a compartment over said opening for receiving an envelope having an outwardly extending tab, mechanism for impressing a receipt upon a part of said tab, mechanism for severing said receipted part from the envelope whereby said receipt may be withdrawn by the depositor while the envelope containing the money passes into the safety receptacle, means normally locking said mechanisms from movement and a trip operated by the envelope coming to inward position for disengaging said locking means.

12. A machine for receiving deposits comprising a safety receptacle having an opening thereinto, a compartment over said opening for receiving an envelope having an outwardly extending tab, mechanism for impressing a receipt upon a part of said tab, mechanism for severing said receipted part from the envelope whereby said receipt may be withdrawn by the depositor while the envelope containing the money passes into the safety receptacle, means for holding the receipt from being withdrawn until the envelope is severed therefrom, means normally locking said mechanisms from movement and a trip operated by the envelope coming to inward position for disengaging said locking means.

13. A machine for receiving deposits comprising a safety receptacle having an opening thereinto, a compartment over said opening for receiving an envelope having an outwardly extending tab, mechanism for impressing a receipt upon a part of said tab, mechanism for severing said receipted part from the envelope whereby said receipt may be withdrawn by the depositor while the envelope containing the money passes into the safety receptacle, means for holding the receipt from being withdrawn until the envelope is severed therefrom, means normally locking said mechanisms from movement, a trip operated by the envelope coming to inward position for disengaging said locking means and a device for preventing the reversal of said mechanisms until all the said operations have been performed.

14. A machine for receiving deposits comprising a safety receptacle having an opening thereinto, a compartment over said opening for receiving an envelope having an outwardly extending tab, a movable floor for said compartment, mechanism for impressing a character indicating the amount deposited to complete a receipt upon a part of said tab and mechanism for severing said receipted part from the envelope whereby the receipted part may be withdrawn by the depositor and means for withdrawing the compartment floor from beneath the envelope whereby the envelope passes into the safety receptacle.

15. A machine for receiving deposits comprising a safety receptacle having an opening thereinto, a compartment over said opening for receiving an envelope having an outwardly extending tab, a movable floor for said compartment, mechanism for impressing a receipt upon a part of said tab and mechanism for severing said receipted part from the envelope whereby the receipted part may be withdrawn by the depositor and means for withdrawing the compartment floor from beneath the envelope and means for pressing said envelope downwardly whereby the envelope passes into the safety receptacle.

16. A machine for receiving deposits comprising a safety receptacle having an opening thereinto, a compartment over said opening for receiving an envelope having an outwardly extending tab, mechanism for impressing a receipt upon a part of said tab and mechanism for severing said receipted part from the envelope whereby the receipted part may be withdrawn by the depositor and means for pressing said envelope downwardly whereby the envelope passes into the safety receptacle.

17. A machine for receiving deposits comprising a safety receptacle having an opening thereinto, a compartment over said opening for receiving an envelope having an outwardly extending tab and a sealing flap overlapping the inner part of said tab, mechanism for fastening together said flap and overlapped part of the tab, mechanism for impressing a receipt upon the outer part of said tab and mechanism for severing said receipted part from the envelope and the inner part of the tab whereby the receipt may be withdrawn by the depositor while the envelope with the flap fastened to the inner part of the tab passes into the safety receptacle.

18. A machine for receiving deposits comprising a safety receptacle having an opening thereinto, a compartment over said opening for receiving an envelope having an outwardly extending tab and a sealing flap overlapping the inner part of said tab, mechanism for non-detachably fastening together said flap and overlapped part of the tab, mechanism for impressing a receipt upon the outer part of said tab and mechanism for severing said receipted part from the envelope and the inner part of the tab whereby the receipt may be withdrawn by the depositor while the envelope with the flap fastened to the inner part of the tab passes into the safety receptacle.

19. A machine for receiving deposits comprising a safety receptacle having an opening thereinto, a compartment over said opening for receiving an envelope having an outwardly extending tab and a sealing flap overlapping the inner part of said tab, mechanism for grasping said tab, mechanism for fastening together said flap and overlapped part of the tab, mechanism for impressing a receipt upon the outer part of said tab and mechanism for severing said receipted part from the envelope and the inner part of the tab whereby the receipt may be withdrawn by the depositor while the envelope with the flap fastened to the inner part of the tab passes into the safety receptacle, said grasping mechanism being first operative and continuing until the severing, receipting and fastening operations are completed.

20. A machine for receiving deposits comprising a safety receptacle having an opening thereinto, a compartment over said opening for receiving an envelope having an outwardly extending tab and a sealing flap overlapping the said tab, mechanism for fastening together said flap and overlapped part of the tab, whereby the envelope with the flap fastened to the inner part of the tab passes into the safety receptacle.

21. A machine for receiving deposits comprising a safety receptacle having an opening thereinto, a plurality of separate compartments thereover for receiving an envelope having an outwardly extending tab, mechanism for each compartment for impressing a receipt upon a part of said tab varying in amount according to the compartment and mechanism for severing said receipted part from the envelope whereby said receipt may be withdrawn by the depositor while the envelope passes into the safety receptacle.

22. A machine for receiving deposits comprising a safety receptacle having separate openings thereinto, a compartment over each of said openings for receiving an envelope having an outwardly extending tab, mechanism for each compartment for impressing a receipt upon a part of said tab varying in amount according to the compartment and mechanism for severing said receipted part from the envelope whereby the receipt may be withdrawn by the depositor while the envelope containing the money passes into the safety receptacle.

23. A machine for receiving deposits comprising a safety receptacle having several chambers and separate openings thereinto, a compartment over each of said openings for receiving an envelope having an outwardly extending tab, mechanism for each compartment for impressing a receipt upon a part of said tab varying in amount according to the compartment and mechanism for severing said receipted part from the envelope whereby said receipt may be withdrawn by the depositor while the envelope passes into the safety receptacle.

24. A machine for receiving deposits comprising a safety receptacle having an opening thereinto, a plurality of separate compartments thereover for receiving an envelope having an outwardly extending tab, mechanism for each compartment for grasping said tab, mechanism for each compartment for impressing a receipt upon a part of said tab varying in amount according to the compartment and mechanism for severing said receipted part from the envelope whereby said receipt may be withdrawn by the depositor while the envelope passes into the safety receptacle, said grasping mechanism being first operative and continuing until the severing operation has been completed.

25. A machine for receiving deposits comprising a safety receptacle having an opening thereinto, a compartment for receiving an envelope having an outwardly extending tab, mechanism for impressing a receipt of varying pre-determined amount upon a part of said tab and mechanism for severing said receipted part from the envelope whereby said receipt may be withdrawn by the depositor while the envelope containing the money passes into the safety receptacle.

26. A machine for receiving deposits comprising a safety receptacle having an opening thereinto, a compartment for receiving an envelope having an outwardly extending tab, mechanism for grasping said tab, mechanism for impressing a receipt of varying pre-determined amount upon a part of said tab and mechanism for severing said receipted part from the envelope whereby said receipt may be withdrawn by the depositor while the envelope containing the money passes into the safety receptacle, said grasping mechanism being first operative and continuing until the severing operation has been completed.

27. A machine for receiving deposits comprising a safety receptacle having an opening thereinto, a compartment for receiving an envelope and a double identifying coupon the inner part of which overlaps said envelope, mechanism for fastening the inner part of said coupon to said envelope, mechanism for impressing a receipt upon the outer part of said coupon and mechanism for separating said two parts of the coupon whereby the outer receipted part may be withdrawn by the depositor while the deposit envelope with the identifying coupon attached thereto passes into the safety receptacle.

28. A machine for receiving deposits comprising a safety receptacle having an opening thereinto, a compartment over said opening for receiving an envelope having an outwardly extending tab and a double identifying coupon the inner part of which overlaps said tab, mechanism for fastening the inner part of said coupon to said tab, mechanism for impressing a receipt upon the outer part of said coupon and mechanism for separating said two parts of the coupon whereby the receipted part may be withdrawn by the depositor while the deposit envelope with the identifying coupon attached thereto passes into the safety receptacle.

29. A machine for receiving deposits comprising a safety receptacle having an opening thereinto, a compartment over said opening for receiving an envelope having an outwardly extending tab and a double identifying coupon the inner part of which overlaps said tab, mechanism for fastening the inner part of said coupon to said tab and mechanism for separating said two parts of the coupon whereby the outer part may be withdrawn by the depositor while the deposit envelope with the identifying coupon attached thereto passes into the safety receptacle.

30. A machine for receiving deposits of money in envelopes comprising a compartment for receiving an envelope of a size to contain an unfolded bank bill and having a portion extending outwardly beyond said money, mechanism for impressing a receipt upon said outwardly extending portion and mechanism for severing said receipted part from the envelope whereby the receipt may be retained by the depositor but the envelope remains in the machine.

31. A machine for receiving deposits of money in envelopes comprising a compartment for receiving an envelope of a size to contain an unfolded bank bill and having a portion extending outwardly beyond said money, mechanism for grasping said envelope, mechanism for impressing a receipt upon said outwardly extending portion and mechanism for severing said receipted part from the envelope, said grasping means then becoming inoperative whereby the receipt may be retained by the depositor but the envelope remains in the machine.

32. In a machine for receiving deposits of money in envelopes, mechanism for first grasping said envelope, mechanism for forming a receipt upon a part of said envelope beyond the money, mechanism for severing its receipted part from the envelope and means for then rendering said grasping means inoperative.

33. In a machine for receiving deposits of money in envelopes, mechanism for forming a receipt upon a part of the envelope beyond the money and mechanism for severing said receipted part from the envelope.

34. In a machine for receiving deposits of money in envelopes, mechanism for impressing a receipt upon a part of said envelope beyond the money, mechanism for impressing an indication of the amount of said receipt upon another part of the envelope and mechanism for severing said receipted part from the rest of the envelope.

35. In a machine for receiving deposits of money in envelopes, an envelope-receiving compartment adapted to receive an envelope with an outwardly extending tab and a double identifying coupon the inner part of which overlaps said tab and a holder adapted to hold said envelope and said coupon and carry them into the compartment in said overlapping position.

36. In a machine for receiving deposits of money in envelopes, an envelope-receiving compartment adapted to receive an envelope with an outwardly extending tab and a double identifying coupon the inner part of which overlaps said tab, a holder adapted to hold said envelope and said coupon and carry them into the compartment in said overlapping position, means for impressing a receipt upon the outer part of said coupon and means for severing said receipt from the envelope.

37. In a machine for receiving deposits of money in envelopes, an envelope-receiving compartment adapted to receive an envelope with an outwardly extending tab and a double identifying coupon the inner part of which overlaps said tab, a holder adapted to hold said envelope and said coupon and carry them into the compartment in said overlapping position, and means for fastening said inner coupon to the envelope.

38. In a machine for receiving deposits of money in envelopes, an envelope-receiving compartment adapted to receive an envelope with an outwardly extending tab and a double identifying coupon the inner part of which overlaps said tab, a holder adapted to hold said envelope and said coupon and carry them into the compartment in said overlapping position, means for fastening said inner coupon to the envelope, mechanism for impressing a receipt upon the outer part of said coupon and means for severing said receipt from said inner coupon and from the envelope.

39. In a machine for receiving deposits of money in envelopes, an envelope-receiving compartment adapted to receive an envelope with an outwardly extending tab and a double identifying coupon the inner part of which overlaps said tab, a holder adapted to hold said envelope and said coupon and carry them into the compartment in said overlapping position, and means for releasing the envelope from the holder.

40. In a machine for receiving deposits of money in envelopes, an envelope-receiving compartment adapted to receive an envelope with an outwardly extending tab and a double identifying coupon the inner part of which overlaps said tab, a holder adapted to hold said envelope and said coupon and carry them into the compartment in said overlapping position, means for impressing a receipt upon the outer part of said coupon and means for severing said receipt from the envelope, said holder having an aperture opposite said receipt-impressing mechanism and having a transverse slot opposite said severing mechanism.

In witness whereof I have affixed my signature, this 19th day of April, 1922.

HAROLD B. KLINE.